(12) United States Patent
Kitahama et al.

(10) Patent No.: US 11,551,549 B2
(45) Date of Patent: Jan. 10, 2023

(54) MANAGEMENT SYSTEM AND MANAGEMENT METHOD

(71) Applicant: TOYOTA JIDOSHA KABUSHIKI KAISHA, Toyota (JP)

(72) Inventors: Kenichi Kitahama, Toyota (JP); Ryo Murakami, Susono (JP); Hisashi Iizuka, Susono (JP); Mitsunori Hosokawa, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 162 days.

(21) Appl. No.: 17/110,192

(22) Filed: Dec. 2, 2020

(65) Prior Publication Data

US 2021/0209945 A1 Jul. 8, 2021

(30) Foreign Application Priority Data

Jan. 6, 2020 (JP) .............................. JP2020-000579

(51) Int. Cl.
*G08G 1/0967* (2006.01)
*G05D 1/02* (2020.01)
*G08G 1/00* (2006.01)

(52) U.S. Cl.
CPC ..... *G08G 1/096725* (2013.01); *G05D 1/0291* (2013.01); *G08G 1/202* (2013.01); *G08G 1/205* (2013.01)

(58) Field of Classification Search
None
See application file for complete search history.

(56) References Cited

U.S. PATENT DOCUMENTS

| | | | |
|---|---|---|---|
| 2013/0110934 A1 | 5/2013 | Shibuya et al. | |
| 2015/0211875 A1* | 7/2015 | Alduaiji | G01C 21/3492 701/487 |
| 2018/0143298 A1 | 5/2018 | Newman | |
| 2018/0198865 A1 | 7/2018 | Kurihara et al. | |
| 2018/0376305 A1* | 12/2018 | Ramalho de Oliveira | H04W 4/44 |
| 2019/0197886 A1 | 6/2019 | Kanehara et al. | |
| 2019/0339692 A1* | 11/2019 | Sakai | G05D 1/0027 |
| 2020/0377128 A1* | 12/2020 | Marczuk | G06Q 10/063 |

FOREIGN PATENT DOCUMENTS

| | | |
|---|---|---|
| CN | 102959577 A | 3/2013 |
| CN | 109147370 A | 1/2019 |
| CN | 109979218 A | 7/2019 |
| JP | 6567483 B2 | 8/2019 |

* cited by examiner

*Primary Examiner* — Maceeh Anwari
*Assistant Examiner* — Charles Pall
(74) *Attorney, Agent, or Firm* — Oliff PLC

(57) ABSTRACT

It is possible to manage information on a city area in a centralized manner and reduce a processing load. A management system includes: information acquisition means that is provided in infrastructure of a predetermined city area and acquire information on the city area; service providing means sending instructions to respective mobile bodies for providing a plurality of different conveyance services, each of the mobile bodies including a sensor configured to detect the information on the city area and moving in the city area based on the information detected by the sensor, thereby providing each of the conveyance services; and instruction means for sending an instruction to the service providing means based on the information on the city area acquired by the information acquisition means.

17 Claims, 5 Drawing Sheets

MANAGEMENT SYSTEM AND MANAGEMENT METHOD

CROSS REFERENCE TO RELATED APPLICATIONS

This application is based upon and claims the benefit of priority from Japanese patent application No. 2020-000579, filed on Jan. 6, 2020, the disclosure of which is incorporated herein in its entirety by reference.

BACKGROUND

The present disclosure relates to a management system that manages a mobile body and a management method.

A management system including a server that acquires information on a city area via respective clients, analyzes the acquired information, and transmits information determined based on the result of the analysis to the clients has been known (see, for example, Japanese Patent No. 6567483).

SUMMARY

In the above management system, the information on the city area is processed by each of the clients and is then transmitted to the server. Therefore, in this case, it is possible that a processing load may be applied to each of the clients.

One aspect of the present disclosure for attaining the above object is a management system including: information acquisition means that is provided in infrastructure of a predetermined city area and acquire information on the city area; service providing means sending instructions to respective mobile bodies for providing a plurality of different conveyance services, each of the mobile bodies including a sensor configured to detect the information on the city area and moving in the city area based on the information detected by the sensor, thereby providing each of the conveyance services; and instruction means for sending an instruction to the service providing means based on the information on the city area acquired by the information acquisition means.

In this aspect, the instruction means may determine, when interference with travelling occurs between the mobile bodies, which mobile body should preferentially travel based on the information on the city area acquired by the information acquisition means and send an instruction to the service providing means.

In this aspect, the instruction means may directly send an instruction to the mobile body based on the information on the city area acquired by the information acquisition means without the service providing means being involved under a predetermined condition.

In this aspect, the mobile body may be configured to preferentially follow the instruction from the service providing means when it has received instructions from both the service providing means and the instruction means.

In this aspect, the instruction means may switch, based on the information on the city area acquired by the information acquisition means, between a normal mode in which the mobile body is in a normal state and sends an instruction to the mobile body via the service providing means, and an emergency mode in which the mobile body is in an emergency state and directly sends an instruction to the mobile body without the service providing means being involved.

In this aspect, the instruction means may determine, based on the information on the city area acquired by the information acquisition means, a roadway through which the mobile body preferentially travels, and instruct the mobile body to travel through the determined roadway.

In this aspect, the instruction means may accumulate, when it has sent an instruction to the mobile body via the service providing means, obedience information indicating whether the mobile body has followed the instruction.

In this aspect, the instruction means may change an instruction for the mobile body based on the obedience information.

In this aspect, the service providing means may request the instruction means for a travelling instruction of the mobile body when a set condition is satisfied, and the instruction means may send the travelling instruction to the service providing means in accordance with the request based on the information on the city area acquired by the information acquisition means.

In this aspect, the set condition may include at least one of a case in which the mobile body enters an intersection, a case in which an accident of the mobile body has occurred, a case in which the mobile body cannot move due to congestion, and a case in which the mobile body cannot move due to construction.

In this aspect, instructions for the service providing means are associated with a specification of the mobile body, and the instruction means may change instructions for the service providing means in accordance with the specification of the mobile body.

In this aspect, the service providing means may include a remote driving management unit that remotely sends a travelling instruction to the mobile body when the mobile body can no longer move and the remote driving management unit has received a request for a travelling instruction from the mobile body.

In this aspect, the service providing means may include a mobile body recognition unit configured to recognize information indicating where and what attributes of the mobile body are present based on at least one of the information on the city area acquired by the information acquisition means and the information detected by the sensor of the mobile body and provide the recognized information for the mobile body.

In this aspect, the mobile body may be an electric car that is driven by power of a battery, and the service providing means may include a charging/discharging management unit that monitors a charging amount of the battery of the mobile body and sends an instruction regarding a timing and a charging/discharging place where the mobile body should perform charging/discharging to the mobile body based on the charging amount.

In this aspect, the information acquisition means may acquire information on an amount of power generation of each power generator located in the predetermined city area, each of the power generators may be configured to be able to charge a battery of the mobile body, and the charging/discharging management unit may determine a power generator capable of charging the mobile body from among power generators based on information on an amount of power generation of each of the power generators acquired by the information acquisition means, determine a mobile body to be charged based on charging amounts of the batteries of the mobile bodies, and send an instruction to the mobile body so that the determined mobile body can be charged by the determined power generator.

In this aspect, the service providing means and the instruction means may manage information on the mobile body based on identification information associated with the mobile body.

One aspect of the present disclosure for attaining the above object may be a management method including the steps of: acquiring by information acquisition means provided in infrastructure of a predetermined city area information on the city area; sending instructions to respective mobile bodies for providing a plurality of different conveyance services, each of the mobile bodies including a sensor configured to detect the information on the city area and moving in the city area based on the information detected by the sensor, thereby providing each of the conveyance services; and sending an instruction to the mobile body based on the acquired information on the city area.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
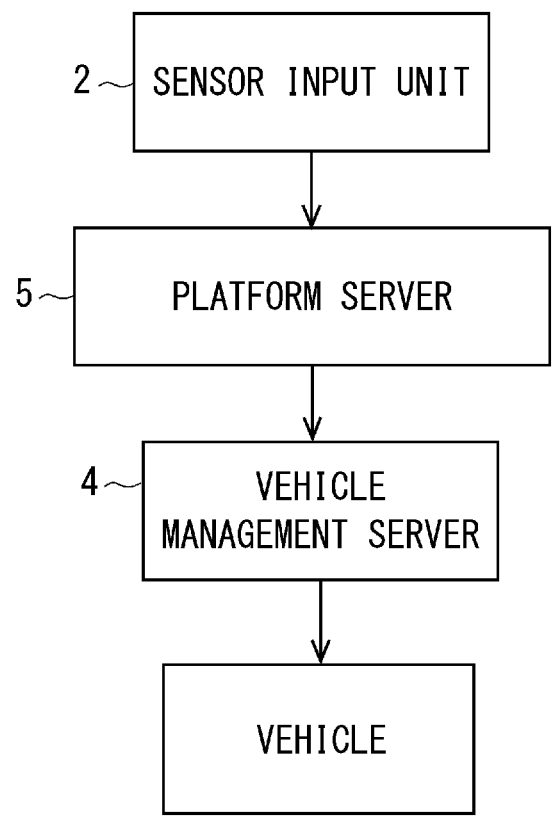
FIG. 1 is a block diagram showing a schematic system configuration of a management system according to one embodiment.

Hereinafter, with reference to the drawings, an embodiment of the present disclosure will be described. FIG. 1 is a block diagram showing a schematic system configuration of a management system according to this embodiment. A management system 1 according to this embodiment controls movement of mobile bodies of different types that travel in a predetermined city area in an integrated manner. For example, infrastructure such as roads, bridges, facilities, and parks is provided in the predetermined city area.

The mobile bodies of different types are vehicles for providing a plurality of different conveyance services for users, and include, for example, an autonomous mobile shared car (hereinafter it will be referred to as a shared car), an autonomous mobile bus (hereinafter it will be referred to as a bus), an autonomous mobile logistics vehicle that travels on the ground and conveys packages or the like (hereinafter it will be referred to as a ground logistics car), an autonomous mobile logistics vehicle that travels under the ground and conveys packages or the like (hereinafter it will be referred to as an underground logistics car) and the like.

The shared car is a vehicle for providing a shared car service such as a taxi shared by a plurality of persons. The bus is a vehicle for providing a bus service for commuting to offices or schools. The ground logistics car is a vehicle for providing a ground logistics service for conveying packages on the ground. The underground logistics car is a vehicle for providing an underground logistics service for conveying packages under the ground.

As shown in FIG. 1, the management system 1 according to this embodiment includes a sensor input unit 2 configured to acquire information on the city area, a vehicle management server 4 that provides each conveyance service by sending instructions to vehicles for providing a plurality of different conveyance services, and a platform server 5 that sends an instruction to the vehicle management server 4 based on the information on the city area acquired by the sensor input unit 2. Accordingly, the platform server 5 is able to manage information on the city area in a centralized manner and send an instruction to the vehicle management server 4 that provides each conveyance service. Accordingly, it is possible to manage the information on the city area by the platform server 5 in a centralized manner and reduce the processing load of the vehicle management server 4.

Figure 2:
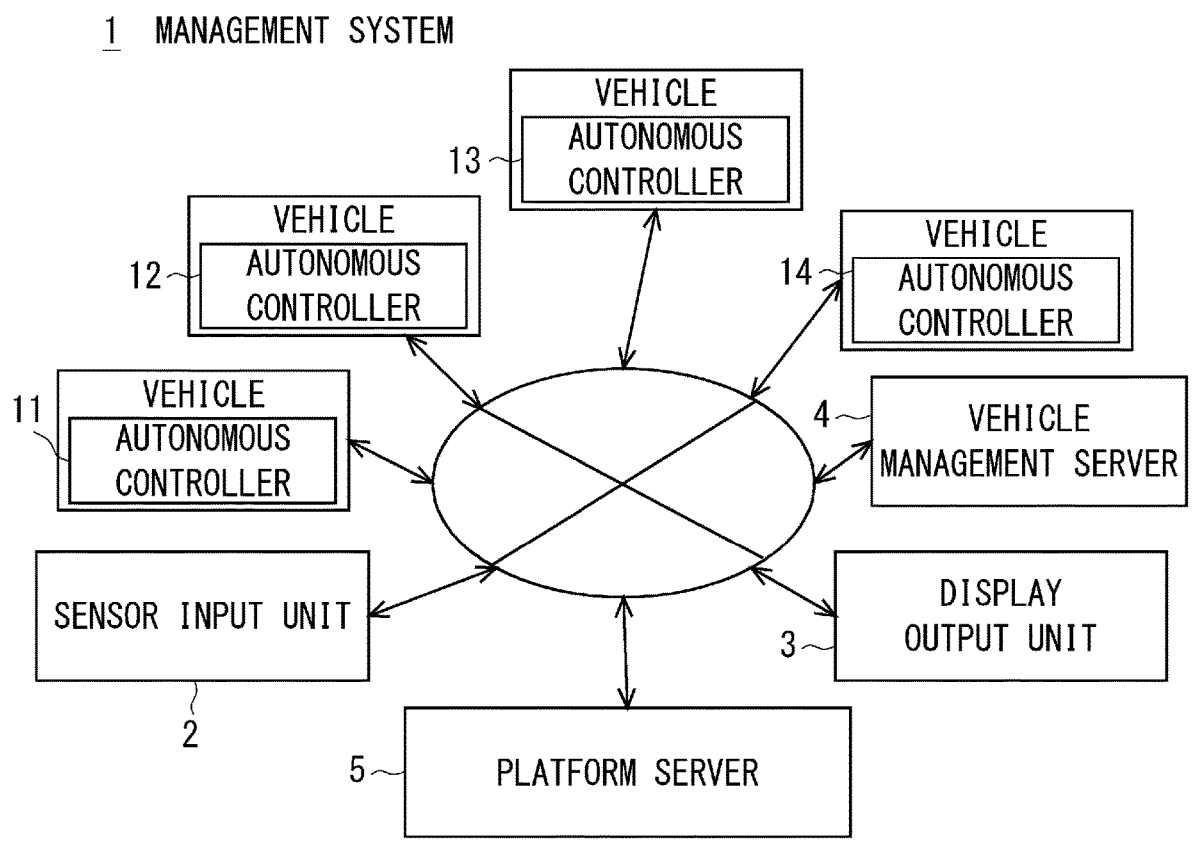
FIG. 2 is a diagram showing a communication network of the management system according to the embodiment.

FIG. 2 is a diagram showing a communication network of the management system. The sensor input unit 2, a display output unit 3, the vehicle management server 4, the platform server 5, and autonomous controllers 11 to 14 of the respective vehicles are connected to one another via a wire or wirelessly and communicate information with one another. The sensor input unit 2, the display output unit 3, the vehicle management server 4, the platform server 5, and the autonomous controllers 11 to 14 of the respective vehicles are connected to one another via, for example, a communication network such as the Internet, Local Area Network (LAN), or Wide Area Network (WAN). The vehicle management server 4 and the platform server 5 may be integrally formed in one server.

Each of the vehicles is provided with a vehicle sensor such as a camera, a millimeter wave radar, an ultrasonic sensor, a Laser Imaging Detection and Ranging (LIDAR), or a magnetic sensor. Each of the vehicles is able to acquire vehicle information such as State of Charge (SOC). The respective vehicles include the autonomous controllers 11-14 that perform feedback control or the like and autonomously control vehicles based on sensor information detected by the vehicle sensor. The autonomous controllers 11-14 are incorporated in an Electric Control Unit (ECU) that controls vehicles.

The autonomous controllers 11-14 each make plans, for example, for an operation of the vehicle so that the vehicle arrives at a preset target location at a target arrival time and autonomously control the vehicle based on the sensor information of the vehicle sensor and vehicle information in accordance with the operation plan.

The sensor input unit 2 is one specific example of information acquisition means. The sensor input unit 2, which is provided in infrastructure of a predetermined city area, acquires information on the city area. The sensor input unit 2, which is provided in the city area, includes a sensor that detects information in the city area, a remote operation apparatus that receives operation information for remotely operating vehicles, an information terminal such as a smartphone held by a user and the like.

The sensor includes a magnetic marker provided in a road, a parking lot, a stop, or a charging place, a sensor pole provided on a road, a logistics sensor provided in a logistics yard or a building, and a road stud sensor provided in road studs. The sensor pole is provided with a camera, a millimeter wave radar, an ultrasonic sensor, a LIDAR or the like. The logistics sensor includes a contact sensor, a camera, an ultrasonic sensor or the like that detects contact of a vehicle. The remote operation apparatus is provided in a management center or the like.

The sensor input unit 2 transmits the sensor information and the input information to the platform server 5 and also to the autonomous controllers 11 to 14 of the respective vehicles.

The display output unit 3 includes a display apparatus and an output apparatus provided in the city area. The display apparatus is a remote operation display unit in a management center that displays information on a vehicle that performs a remote operation, a display unit that is provided in a sensor pole of a road and displays information, a display unit of an information terminal owned by a user, road studs provided on a road, etc. The display unit is composed of, for example, a liquid crystal display, an organic Electro Luminescence (EL) display or the like. The output apparatus, which is provided in a parking lot, includes a gate bar apparatus that opens and/or closes a gate, traffic lights, a car washing machine, a logistics apparatus provided in a logistics yard or a logistics building, a charging stand that is provided in a parking lot and charges vehicles and the like.

The vehicle management server 4 is one specific example of service providing means. The vehicle management server 4 provides each conveyance service by sending instructions to the respective vehicles. The vehicle management server 4 manages information of each vehicle based on the identification information associated with each of the vehicles.

Figure 3:
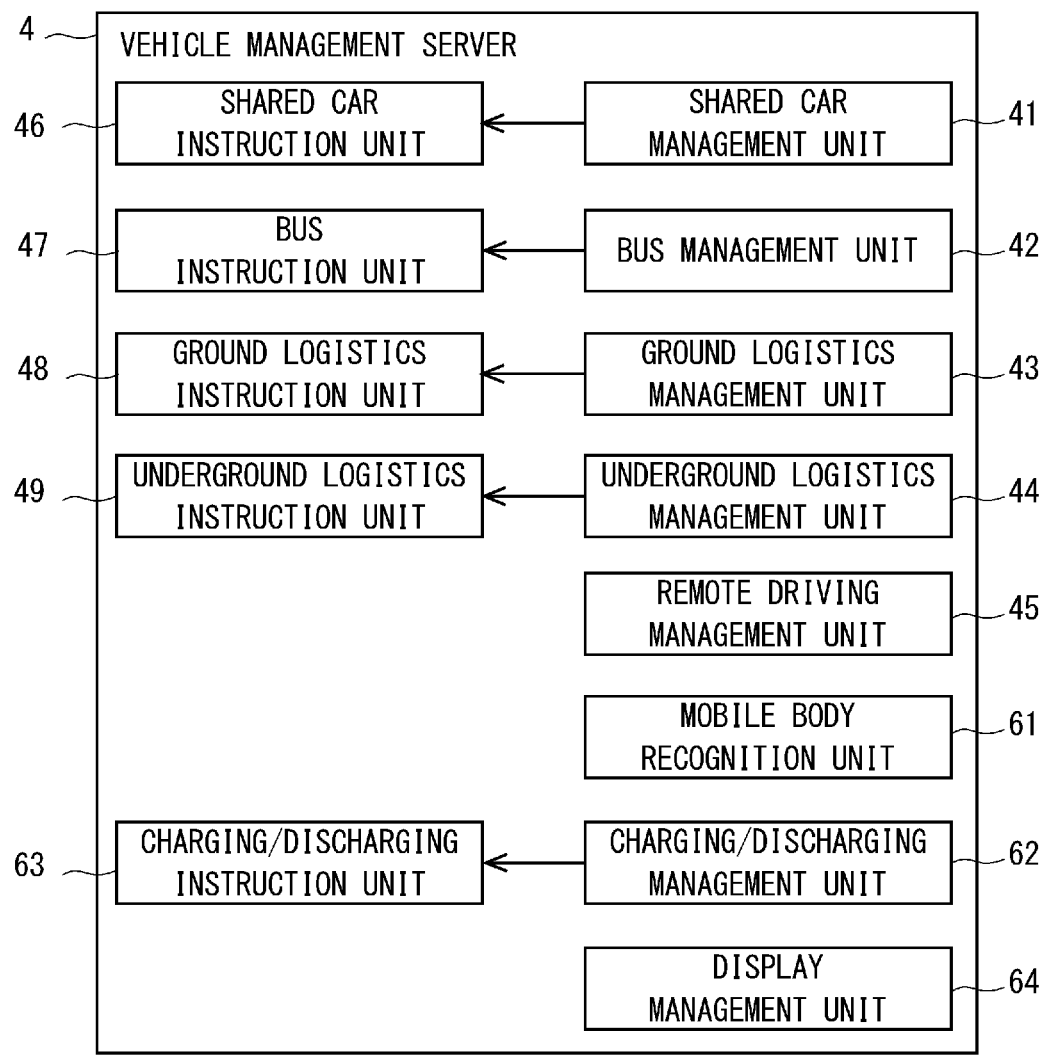
FIG. 3 is a block diagram showing a schematic system configuration of a vehicle management server according to the embodiment.

The vehicle management server 4 is a server that manages the conveyance service such as the shared car service, the bus service, and the ground and underground logistics services. FIG. 3 is a block diagram showing a schematic system configuration of the vehicle management server 4 according to this embodiment.

The vehicle management server 4 according to this embodiment includes a shared car management unit 41, a bus management unit 42, a ground logistics management unit 43, an underground logistics management unit 44, a remote driving management unit 45, a shared car instruction unit 46, a bus instruction unit 47, a ground logistics instruction unit 48, an underground logistics instruction unit 49, a mobile body recognition unit 61, a charging/discharging management unit 62, a charging/discharging instruction unit 63, and a display management unit 64.

The shared car management unit 41 performs the shared car service by managing the operation of the shared car via the shared car instruction unit 46. The bus management unit 42 performs the bus service by managing the operation of the bus via the bus instruction unit 47. The ground logistics management unit 43 performs the ground logistics service by managing the operation of the ground logistics car via the ground logistics instruction unit 48. The underground logistics management unit 44 performs the underground logistics service by managing an operation of the underground logistics car via the underground logistics instruction unit 49.

While the vehicle management server 4 is configured to perform the shared car service, the bus service, and the ground and underground logistics services as the conveyance service in this embodiment, this embodiment is not limited to this configuration. The vehicle management server 4 may be configured to perform at least one of the shared car service, the bus service, and the ground and underground logistics services or may include a conveyance service other than the above services.

The shared car instruction unit 46 sends an operation instruction to the autonomous controller 11 of the shared car based on the instruction from the shared car management unit 41. The shared car instruction unit 46 may send an operation instruction to the autonomous controller 11 of each of the plurality of shared cars.

The bus instruction unit 47 sends an operation instruction to the autonomous controller 12 of the bus based on the instruction from the bus management unit 42. The bus instruction unit 47 may send an operation instruction to the autonomous controller 12 of each of the plurality of buses. The bus instruction unit 47 includes, besides the function as a driver, a function as a conductor.

The ground logistics instruction unit 48 sends an operation instruction to the autonomous controller 13 of the ground logistics car based on the instruction from the ground logistics management unit 43. The ground logistics instruction unit 48 may send an operation instruction to the autonomous controller 13 of each of the plurality of ground logistics cars.

The underground logistics instruction unit 49 sends an operation instruction to the autonomous controller 14 of the underground logistics car based on the instruction from the underground logistics management unit 44. The underground logistics instruction unit 49 may send an operation instruction to the autonomous controller 14 of each of the plurality of underground logistics cars.

For example, the shared car management unit 41 sets travelling information including the departure place and the arrival place, and the departure time and the arrival time of the shared car, and sends an instruction regarding the set travelling information to the shared car instruction unit 46. The shared car instruction unit 46 sends an instruction regarding the travelling information of the shared car to the autonomous controller 11 of the shared car in accordance with the instruction from the shared car management unit 41.

The remote driving management unit 45 provides a remove driving service that supports the above conveyance service for each vehicle such as a shared car, a bus, a ground logistics car, and an underground logistics car. When each of the vehicles can no longer move due to an accident, construction, congestion or the like and receives a request for the travelling instruction from each of the vehicles, the remote driving management unit 45 remotely sends the travelling instruction to the vehicles. Accordingly, even in a case in which each of the vehicles can no longer move due to an accident, construction, congestion or the like, each of the vehicles is able to perform travelling in accordance with the travelling instruction from the remote driving management unit 45.

The remote driving management unit 45 sends a travelling instruction to the autonomous controllers 11-14 of the shared car, the bus, the ground logistics car, and the underground logistics car based on the operation instruction from the remote operation apparatus. The remote operation apparatus transmits the operation instruction to the remote driving management unit 45 in accordance with operation information such as forward/backward movement, right/left turn, acceleration/deceleration, or stop input by the user. The remote driving management unit 45 may cause the remote operation display unit of the remote operation apparatus to display information such as image information of the vehicle that is performing remote driving.

When, for example, the shared car has been failed or a sudden accident or construction which is not included in map information has occurred and it has been determined that it is difficult to perform an autonomous control, the autonomous controller 11 of the shared car requests a travelling instruction for the remote driving management unit 45. The remote driving management unit 45 remotely sends a travelling instruction to the autonomous controller 11 of the shared car in accordance with the request from the autonomous controller 11 of the shared car.

The mobile body recognition unit 61 recognizes where and what attributes of the mobile body are present based on at least one of information detected by the respective sensors of the sensor input unit 2 and information detected by vehicle sensors of the respective vehicles. The mobile body recognition unit 61 notifies the respective vehicles of the recognized information regarding where and what attributes of the mobile body are present, thereby performing a locator service that supports the above conveyance service.

The mobile body recognition unit 61 performs the above locator service for the shared car, the bus, the ground logistics car, and the underground logistics car. The mobile body recognition unit 61 transmits, for example, information on mobile bodies in a blind spot to the autonomous controller 11 of the shared car. Each of the vehicles is able to timely recognize where and what attributes of the mobile body are present by the information on the mobile body recognition unit 61, which improves the safety of the vehicles.

The shared car, the bus, the ground logistics car, and the underground logistics car may be electric cars that travel by driving a motor using power of a battery. The charging/discharging management unit 62 performs a charging/discharging service that supports the above conveyance service by managing charging/discharging of the shared car, the bus, the ground logistics car, and the underground logistics car.

The charging/discharging management unit 62 monitors charging amounts of the batteries of the shared car, the bus, the ground logistics car, and the underground logistics car and sends instructions regarding the timing when the shared car, the bus, the ground logistics car, and the underground logistics car should perform charging/discharging and the charging/discharging place based on the charging amounts. Accordingly, the shared car, the bus, the ground logistics car, and the underground logistics car are able to perform charging/discharging at appropriate timings and charging/discharging place in accordance with the instructions from the charging/discharging management unit 62.

The charging/discharging management unit 62 manages charging/discharging of the shared car, the bus, the ground logistics car, and the underground logistics car via the charging/discharging instruction unit 63. The charging/discharging instruction unit 63 performs charging/discharging instructions to the shared car instruction unit 46, the bus instruction unit 47, the ground logistics instruction unit 48, and the underground logistics instruction unit 49 based on the instructions from the charging/discharging management unit 62. The autonomous controllers 11-14 of the shared car, the bus, the ground logistics car, and the underground logistics car perform charging/discharging of the battery based on the charging/discharging instructions from the shared car instruction unit 46, the bus instruction unit 47, the ground logistics instruction unit 48, and the underground logistics instruction unit 49.

The charging/discharging management unit 62 manages the charging amounts of the batteries of the shared car, the bus, the ground logistics car, and the underground logistics car. The charging/discharging management unit 62 determines the timing and the charging place where each vehicle performs charging/discharging based on the charging amounts of the batteries of the shared car, the bus, the ground logistics car, and the underground logistics car.

For example, the charging/discharging management unit 62 determines that it is time to perform charging when it is determined that the charging amounts of the batteries of the shared car, the bus, the ground logistics car, and the underground logistics car has become equal to or smaller than a predetermined amount. The charging/discharging management unit 62 further determines the charging place that is the closest from the current location of the vehicle as a charging place where the vehicle is charged at this timing of charging.

The charging/discharging management unit 62 sends a charging/discharging instruction for charging/discharging each of the vehicles at a determined timing and a charging place to the charging/discharging instruction unit 63. The charging/discharging instruction unit 63 sends charging/discharging instructions to the shared car instruction unit 46, the bus instruction unit 47, the ground logistics instruction unit 48, and the underground logistics instruction unit 49 in accordance with the charging/discharging instruction from the charging/discharging management unit 62.

A plurality of power generators such as a thermal power generator, a wind power generator, a photovoltaic power generator, a geothermal generator, a hydroelectric power generator, a biomass power generator and the like are provided in the predetermined city area. Each of the power generators is configured to be able to charge the batteries of the shared car, the bus, the ground logistics car, and the underground logistics car.

The sensor input unit 2 acquires information on the amount of power generation of each of the power generators and transmits the acquired information on the amount of power generation of each of the power generators to the information database 53 of the platform server 5.

The charging/discharging management unit 62 determines the power generator capable of charging each of the vehicles from among the power generators installed in the predetermined city area based on information on the amount of power generation of each power generator of the information database 53.

The charging/discharging management unit 62 may determine the power generator that generates an amount of power equal to or more than a predetermined amount to be a power generator capable of charging each of the vehicles from among the power generators installed in the predetermined city area. The amount of power that can be charged to each of the vehicles is set as a predetermined amount.

The charging/discharging management unit 62 determines the vehicle to be charged based on the charging amounts of the batteries of the respective vehicles such as a shared car or a bus. The charging/discharging management unit 62 determines a vehicle whose charging amount of the battery becomes equal to or smaller than a predetermined amount to be a vehicle to be charged. The charging/discharging management unit 62 sends an instruction to the vehicle via the charging/discharging instruction unit 63 so as to cause the determined vehicle to be charged using the determined power generator.

Accordingly, since each of the power generators is able to supply the power that it has generated to the battery of each vehicle, it does not need to include a battery or it is sufficient that it include a battery having a small capacity. It is therefore possible to significantly reduce the equipment cost. Further, each of the vehicles is able to timely charge the battery in accordance with the instruction from the charging/discharging management unit 62.

The display management unit 64 performs a road display service that supports the above conveyance service by displaying road information. The display management unit 64 is able to cause the display unit provided at the road studs or the sensor pole based on the sensor information such as the road stud sensor.

While the vehicle management server 4 is configured to perform the remote driving service, the locator service, the charging/discharging service, and the road display service as the support service that supports the above conveyance service, this embodiment is not limited to this configuration. The vehicle management server 4 may be configured to perform at least one of the remote driving service, the locator service, the charging/discharging service, and the road display service, or a support service other than these services (e.g., an edge processing service). The vehicle management server 4 may avoid a sudden accident and the like by directly sending a travelling instruction to the autonomous controllers 11-14 of the shared car, the bus, the ground logistics car, and the underground logistics car in the edge processing service.

Further, while the shared car management unit 41, the bus management unit 42, the ground logistics management unit 43, the underground logistics management unit 44, the remote driving management unit 45, the shared car instruction unit 46, the bus instruction unit 47, the ground logistics instruction unit 48, the underground logistics instruction unit 49, the mobile body recognition unit 61, the charging/discharging management unit 62, the charging/discharging instruction unit 63, and the display management unit 64 are integrally formed in the vehicle management server 4, this embodiment is not limited to this configuration.

For example, the above components may be formed in servers different from one another for each service. More specifically, the shared car management unit 41 and the shared car instruction unit 46, the bus management unit 42 and the bus instruction unit 47, the ground logistics management unit 43 and the ground logistics instruction unit 48, the underground logistics management unit 44 and the underground logistics instruction unit 49, the remote driving management unit 45, the mobile body recognition unit 61, the charging/discharging management unit 62 and the charging/discharging instruction unit 63, and the display management unit 64 may be formed in servers different from one another.

The platform server 5 is one specific example of instruction means. The platform server 5 sends an instruction to the vehicle management server 4 based on the information on the city area acquired by the sensor input unit 2. The platform server 5 manages information on each vehicle based on the identification information associated with each of the vehicles.

Figure 4:
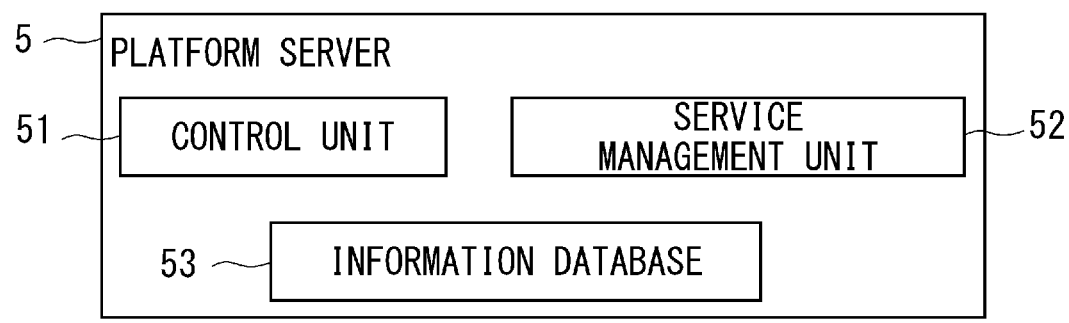
FIG. 4 is a block diagram showing a schematic system configuration of a platform server according to the embodiment.

FIG. 4 is a block diagram showing a schematic system configuration of the platform server according to this embodiment. The platform server 5 according to this embodiment includes a control unit 51, a service management unit 52, and an information database 53.

The control unit 51 controls the shared car, the bus, the ground logistics car, and the underground logistics car. The control unit 51 controls the shared car, the bus, the ground logistics car, and the underground logistics car by sending an operation instruction to the shared car instruction unit 46, the bus instruction unit 47, the ground logistics instruction unit 48, and the underground logistics instruction unit 49.

The control unit 51 includes a function of performing traffic regulation of a plurality of vehicles. The control unit 51 determines, when travelling interference occurs between the vehicles, which vehicle should preferentially travel based on the information on the city area acquired by the sensor input unit 2 and sends an instruction to the vehicle management server 4. Accordingly, the control unit 51 is able to comprehensively determine the priority orders of the respective vehicles from the information on the city area acquired by the sensor input unit 2, and to send an instruction regarding the determined priority orders to the vehicle management server 4.

When, for example, a shared car and a bus cross each other at an intersection without traffic lights, the control unit 51 determines which one of the shared car and the bus should be prioritized based on the information on the city area such as traffic congestion information and sends instructions to the shared car instruction unit 46 and the bus instruction unit 47. The shared car instruction unit 46 sends an instruction to the autonomous controller 11 of the shared car in accordance with the instruction from the control unit 51. Likewise, the bus instruction unit 47 sends an instruction to the autonomous controller 12 of the bus in accordance with the instruction from the control unit 51.

When a plurality of shared cars cross each other at an intersection without traffic lights, the control unit 51 may determine which one of the shared cars should be prioritized based on the information on the city area in view of the traffic amount or the like and send an instruction to the shared car instruction unit 46. At this time, the shared car instruction unit 46 may send an instruction to the autonomous controller 11 of each of the shared cars in accordance with the instruction from the control unit 51 preferentially over the instruction from the shared car management unit 41.

The control unit 51 sends instructions to the autonomous controllers 11-14 of the shared car, the bus, the ground logistics car, and the underground logistics car via the shared car instruction unit 46, the bus instruction unit 47, the ground logistics instruction unit 48, and the underground logistics instruction unit 49 of the vehicle management server 4. However, under a predetermined condition, the control unit 51 may directly send instructions to the autonomous controllers 11 to 14 of the respective vehicles without the shared car instruction unit 46, the bus instruction unit 47, the ground logistics instruction unit 48, and the underground logistics instruction unit 49 of the vehicle management server 4 being involved.

Accordingly, the control unit 51 is able to comprehensively make a determination from the information on the city area acquired by the sensor input unit 2 under a special condition such as a case in which an accident, construction, congestion, a natural disaster or the like has occurred and to directly send an instruction to each of the vehicles.

The autonomous controllers 11 to 14 of the respective vehicles are configured to preferentially follow an instruction from the vehicle management server 4 when they have received instructions from both the vehicle management server 4 and the control unit 51. That is, typically, operation instructions are sent to the respective vehicles in an integrated manner using information on the city area in the hierarchical structure from the upstream to the downstream as follows.

The service management unit 52 of the platform server 5 sends instructions to the shared car management unit 41, the bus management unit 42, the ground logistics management unit 43, and the underground logistics management unit 44 of the downstream vehicle management server 4 based on the information on the city area. The shared car management unit 41, the bus management unit 42, the ground logistics management unit 43, and the underground logistics management unit 44 send instructions to the shared car instruction unit 46, the bus instruction unit 47, the ground logistics instruction unit 48, and the underground logistics instruction unit 49 that are provided on the downstream thereof in accordance with the instructions from the service management units. Then the shared car instruction unit 46, the bus instruction unit 47, the ground logistics instruction unit 48, and the underground logistics instruction unit 49 send instructions to the autonomous controllers 11-14 of the shared car, the bus, the ground logistics car, and the underground logistics car that are provided on the downstream thereof in accordance with the instructions. The autonomous controllers 11-14 control the shared car, the bus, the ground logistics car, and the underground logistics car in accordance with the instructions.

The control unit 51 is switched between a normal mode in which the vehicle that is to be controlled is in a normal state and an emergency mode in which the vehicle that is to be controlled is in an emergency state based on the information on the city area acquired by the sensor input unit 2. The control unit 51, which is normally in the normal mode, is switched from the normal mode to the emergency mode when, for example, an emergency situation such as collision of a vehicle with a person or collision of vehicles is predicted based on the information from the mobile body recognition unit 61.

The control unit 51 sends an instruction to each of the autonomous controller 11 of the shared car, the autonomous controller 12 of the bus, the autonomous controller 13 of the ground logistics car, and the autonomous controller 14 of the underground logistics car via the shared car instruction unit 46, the bus instruction unit 47, the ground logistics instruction unit 48, and the underground logistics instruction unit 49 in the normal mode.

On the other hand, the control unit 51 directly sends an instruction to each of the autonomous controller 11 of the shared car, the autonomous controller 12 of the bus, the autonomous controller 13 of the ground logistics car, and the autonomous controller 14 of the underground logistics car without the shared car instruction unit 46, the bus instruction unit 47, the ground logistics instruction unit 48, and the underground logistics instruction unit 49 being involved in the emergency mode.

Accordingly, when the vehicle that is to be controlled is in the emergency state, the control unit 51 switches from the normal mode to the emergency mode and is able to quickly send instructions to the shared car, the bus, the ground logistics car, and the underground logistics car that are in the emergency state. Each of the vehicles is able to safely and definitely avoid emergency situations by the instructions from the control unit 51.

The control unit 51 may determine the roadway where the shared car or the bus preferentially travels based on the information on the city area acquired by the sensor input unit 2 and send an instruction to the shared car instruction unit 46 or the bus instruction unit 47 in such a way that the shared car or the bus travels on the determined roadway. By determining the roadway where the shared car or the bus preferentially travels based on the information on the city area and sending instructions, it is possible to efficiently prevent congestion in the city area.

When, for example, it has been determined that congestion is occurring due to an accident, construction or the like based on the information on the city area acquired by the sensor input unit 2, the control unit 51 determines the roadway where the shared car or the bus preferentially travels in such a way that this congestion is prevented. The control unit 51 sends instructions to the shared car instruction unit 46 and the bus instruction unit 47 in such a way that the shared car and the bus travel on the determined roadway.

The control unit 51 may monitor, when it has sent instructions to the shared car, the bus, the ground logistics car, and the underground logistics car via the shared car instruction unit 46, the bus instruction unit 47, the ground logistics instruction unit 48, and the underground logistics instruction unit 49, whether or not each of the vehicles has followed the instruction based on image information or the like of each vehicle acquired by the sensor input unit 2.

The control unit 51 accumulates the information indicating whether or not each of the vehicles has followed the instruction in the information database 53 as obedience information. Accordingly, the control unit 51 is able to control the vehicles more efficiently using the obedience information accumulated in the information database 53.

The control unit 51 may change the instruction to each of the vehicles based on the obedience information accumulated in the information database 53. Accordingly, the control unit 51 is able to give more appropriate instructions to the respective vehicles using the accumulated obedience information.

The control unit 51 may give instructions to the shared car instruction unit 46, the bus instruction unit 47, the ground logistics instruction unit 48, and the underground logistics instruction unit 49 that correspond to the shared car, the bus, the ground logistics car, and the underground logistics car that have followed the instructions based on the obedience information accumulated in the information database 53.

When, for example, shared cars cross each other at an intersection without traffic lights, the control unit 51 may send an instruction to the shared car instruction unit 46 of the shared car that has followed the instruction so as to prioritize the shared car that has not followed the instruction based on the obedience information accumulated in the information database. Accordingly, the control unit 51 is able to definitely control the respective shared cars at the intersection by giving an instruction to the shared car that follows the instruction more definitely.

When the set condition has been satisfied, the vehicle management server 4 requests the platform server 5 for a travelling instruction of the vehicle. The platform server 5 sends the travelling instruction to the vehicle management server 4 in accordance with the request based on the information on the city area acquired by the sensor input unit 2.

The set condition includes at least one of a case in which the vehicle enters an intersection, a case in which an accident of a vehicle has occurred, a case in which the vehicle cannot move due to congestion, and a case in which the vehicle cannot move due to construction. Accordingly, even under a predetermined condition in which the vehicle cannot travel due to an accident, construction, congestion or the like, the vehicle is able to appropriately travel in accordance with the travelling instruction from the platform server 5.

When, for example, it is determined that an accident of the shared car has occurred, the shared car instruction unit 46 of the vehicle management server 4 requests the control unit 51 of the platform server 5 for a travelling instruction of the shared car. The control unit 51 sends a travelling instruction to the shared car instruction unit 46 in response to this request based on the information on the city area acquired by the sensor input unit 2. The shared car instruction unit 46 sends an instruction to the shared car in accordance with the travelling instruction from the control unit 51.

The control unit 51 of the platform server 5 may change the instructions for the vehicle management server 4 in accordance with the specification of the vehicle. The control unit 51 stores the specification of the vehicle and instructions for the vehicle management server 4 in such a way that they are associated with each other in advance. Accordingly, the control unit 51 is able to give an appropriate instruction to the vehicle management server 4 in accordance with the specification of the vehicle.

The instructions for the shared car instruction unit 46, the bus instruction unit 47, the ground logistics instruction unit 48, and the underground logistics instruction unit 49 may be associated for each of levels of the automatic control systems included in the autonomous controllers 11-14 of the shared car, the bus, the ground logistics car, and the underground logistics car (automatic driving levels 1-4, etc.) or for each of levels of the processing abilities of computers.

For example, instructions such as stop, acceleration, deceleration, avoidance and the like are associated for the vehicle with the automatic driving level 5. On the other hand, more specific operations such as an acceleration rate, a deceleration rate, a steering angle and the like are associated as instructions for the vehicle with the automatic driving level 2.

The service management unit 52 sends instructions to the shared car management unit 41, the bus management unit 42, the ground logistics management unit 43, the underground logistics management unit 44, the remote driving management unit 45, the charging/discharging management unit 62, and the display management unit 64, thereby managing the service of the whole city area.

When, for example, one person moves to a destination while changing a bus and a shared car, the service management unit 52 makes plans regarding in which section and at what time the bus should operate and in which section and at what time the shared car should operate. The service management unit 52 sends instructions regarding the operation plans to the shared car management unit 41 and the bus management unit 42. The shared car management unit 41 sends an operation instruction to the shared car instruction unit 46 in accordance with the operation plan from the service management unit 52. The shared car instruction unit 46 sends an instruction to the autonomous controller 11 of the shared car in accordance with the operation instruction from the shared car management unit 41. The autonomous controller 11 of the shared car performs an autonomous control of the shared car in accordance with the instruction from the shared car instruction unit 46. Likewise, the bus management unit 42 sends an operation instruction to the bus instruction unit 47 in accordance with the operation plan from the service management unit 52. The bus instruction unit 47 sends an instruction to the autonomous controller 12 of the bus in accordance with the operation instruction from the bus management unit 42. The autonomous controller 12 of the bus performs autonomous control of the bus in accordance with the instruction from the bus instruction unit 47.

The information database 53 accumulates information detected by each sensor of the sensor input unit 2. The information database 53 also stores map information of the city area. Each of the shared car management unit 41, the bus management unit 42, the ground logistics management unit 43, the underground logistics management unit 44, the remote driving management unit 45, the shared car instruction unit 46, the bus instruction unit 47, the ground logistics instruction unit 48, the underground logistics instruction unit 49, the mobile body recognition unit 61, the charging/discharging management unit 62, the charging/discharging instruction unit 63, and the display management unit 64 is configured to be able to acquire information from the information database 53. Likewise, each of the autonomous controllers 11-14 of the shared car, the bus, the ground logistics car, and the underground logistics car is configured to be able to acquire information from the information database 53.

Figure 5:
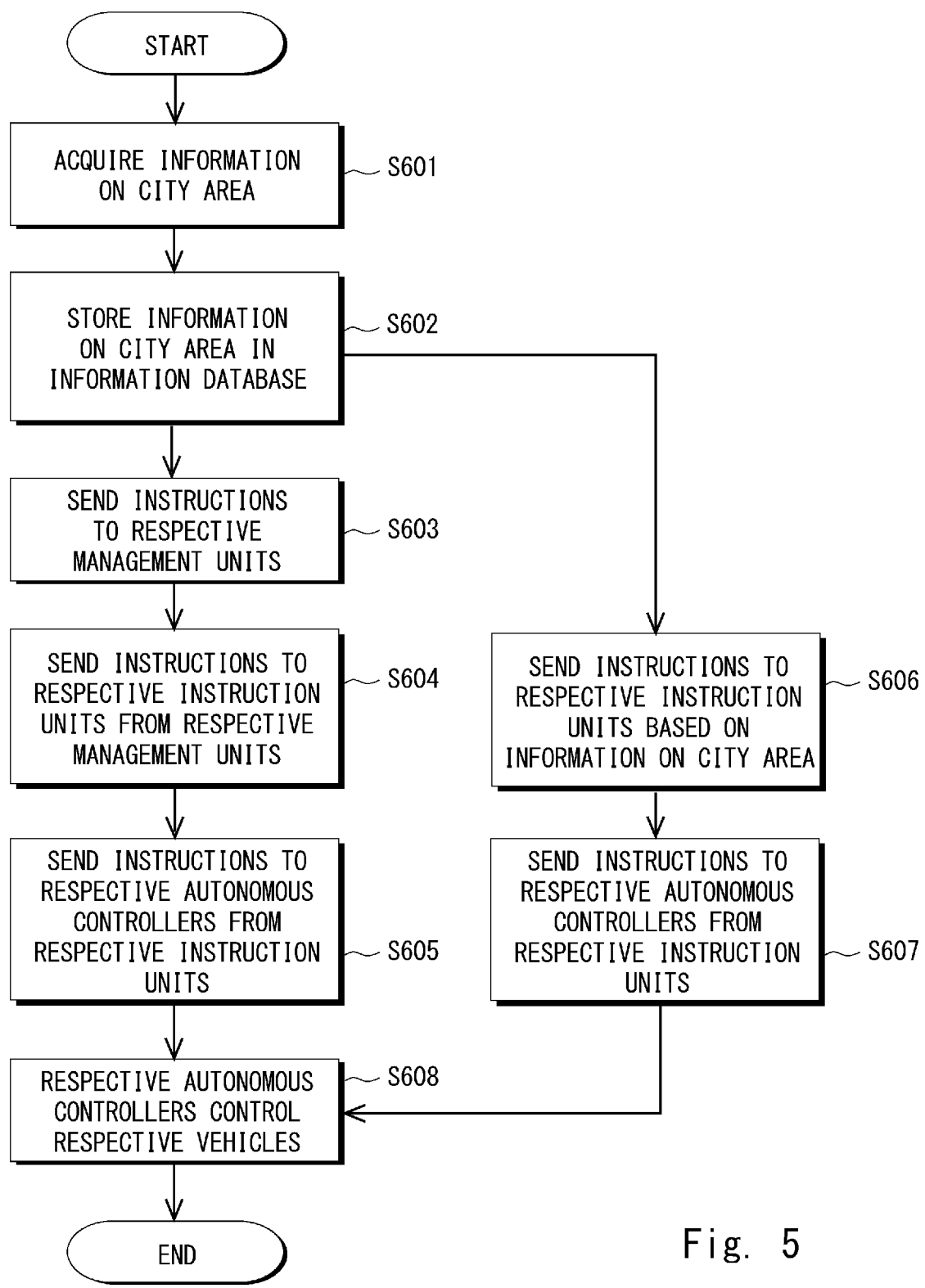
FIG. 5 is a flowchart showing a flow of a management method according to the embodiment.

Next, a management method according to this embodiment will be described. FIG. 5 is a flowchart showing a flow of the management method according to this embodiment.

The sensor input unit 2 acquires information on the city area (Step S601) and transmits the acquired information to the platform server 5 and also to the autonomous controllers 11 to 14 of the respective vehicles. The information database 53 of the platform server stores information on the city area received from the sensor input unit 2 (Step S602).

The service management unit 52 of the platform server 5 sends instructions to the shared car management unit 41, the bus management unit 42, the ground logistics management unit 43, and the underground logistics management unit 44 of the vehicle management server 4 (Step S603).

The shared car management unit 41, the bus management unit 42, the ground logistics management unit 43, and the underground logistics management unit 44 send instructions to the shared car instruction unit 46, the bus instruction unit 47, the ground logistics instruction unit 48, and the underground logistics instruction unit 49 in accordance with the instructions from the service management units (Step S604).

The shared car instruction unit 46, the bus instruction unit 47, the ground logistics instruction unit 48, and the underground logistics instruction unit 49 send instructions to the autonomous controllers 11-14 of the shared car, the bus, the ground logistics car, and the underground logistics car in accordance with the instructions from the service management units (Step S605).

The control unit 51 of the platform server 5 sends instructions to the shared car instruction unit 46, the bus instruction unit 47, the ground logistics instruction unit 48, and the underground logistics instruction unit 49 based on the information on the city area stored in the information database 53 (Step S606).

The shared car instruction unit 46, the bus instruction unit 47, the ground logistics instruction unit 48, and the underground logistics instruction unit 49 send instructions to the autonomous controllers 11-14 of the shared car, the bus, the ground logistics car, and the underground logistics car in accordance with the instructions from the control unit 51 (Step S607).

The autonomous controllers 11-14 of the shared car, the bus, the ground logistics car, and the underground logistics car control the shared car, the bus, the ground logistics car, and the underground logistics car in accordance with the instructions (Step S608).

The management system 1 according to this embodiment has a flexible configuration in that necessary services such as the shared car service, the bus service, the logistics service, and the remote driving service are incorporated into the configurations of the sensor input unit 2 and the display output unit 3 set in each city area and the entire services incorporated by the platform server 5 are integrated and controlled.

Further, the management system 1 according to this embodiment has a hierarchical structure in which the shared car instruction unit 46, the bus instruction unit 47, the ground logistics instruction unit 48, and the underground logistics instruction unit 49 are provided on the upstream of the autonomous controllers 11-14 of the shared car, the bus, the ground logistics car, and the underground logistics car, and the shared car management unit 41, the bus management unit 42, the ground logistics management unit 43, and the underground logistics management unit 44 are provided on the upstream of the shared car instruction unit 46, the bus instruction unit 47, the ground logistics instruction unit 48, and the underground logistics instruction unit 49, and the service management unit 52 that manages the entire city area is provided on the upstream of the shared car management unit 41, the bus management unit 42, the ground logistics management unit 43, and the underground logistics management unit 44. With this hierarchical structure, it is possible to manage a plurality of different conveyance services in an integrated manner.

While several embodiments of the present disclosure have been described above, these embodiments have been presented merely as examples and are not intended to limit the scope of the present disclosure. These novel embodiments may be executed in various other embodiments and may be omitted, replaced, or changed in various ways without departing from the scope of the present disclosure. These embodiments and modifications thereof are included in the scope and the outline of the present disclosure and included in the invention recited in the claims and the equivalent thereof.

The present disclosure is able to achieve the aforementioned processing by causing, for example, a CPU to execute a computer program.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.).

The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A management method comprising:
    acquiring, by a sensor provided in infrastructure of a predetermined city area, information on the city area;
    sending instructions to respective vehicles for providing a plurality of different conveyance services by a first processor, each of the vehicles including: a respective sensor configured to detect the information on the city area and moving in the city area based on the information detected by the respective sensor, thereby providing each of the conveyance services; and an autonomous controller configured to perform feedback control and autonomous control based on the information detected by the sensor;
    sending an instruction to a vehicle based on the acquired information on the city area by a second processor;
    when the second processor has sent an instruction to the vehicle via the first processor, accumulating, by the second processor, obedience information indicating whether the vehicle has followed the instruction;
    changing, by the second processor, an instruction for the vehicle based on the obedience information; and
    when the vehicles cross each other at an intersection without traffic lights, sending, by the second processor, an instruction to the vehicle that has followed the instruction, so as to prioritize the vehicle that has not followed the instruction, based on the accumulated obedience information.

2. The management method according to claim 1, further comprising:
    when travelling interference occurs between the vehicles, determining, by the second processor, which vehicle should preferentially travel based on the information on the city area acquired by the sensor, and sending an instruction to the first processor as to which vehicle should preferentially travel based on the information on the city area acquired by the sensor.

3. The management method according to claim 1, further comprising:
    directly sending, by the second processor, an instruction to the vehicle based on the information on the city area acquired by the sensor, without the first processor being involved under a predetermined condition.

4. The management method according to claim 3, wherein the vehicle is configured to preferentially follow the instruction from the first processor when the vehicle has received instructions from both the first processor and the second processor.

5. The management method according to claim 1, further comprising:
    based on the acquired information on the city area acquired by the sensor, switching, by the second processor, between:
        (i) a normal mode in which the vehicle is in a normal state and sending an instruction to the vehicle via the first processor, and
        (ii) an emergency mode in which the vehicle is in an emergency state, and directly sending an instruction to the vehicle without the first processor being involved.

6. The management method according to claim 1, further comprising:
    based on the information on the city area acquired by the sensor, determining, by the second processor, a roadway through which the vehicle preferentially travels, and instructing the vehicle to travel through the determined roadway.

7. The management method according to claim 1, wherein the first processor requests the second processor for a travelling instruction of the vehicle when a set condition is satisfied, and
    the second processor sends the travelling instruction to the first processor in accordance with the request based on the information on the city area acquired by the sensor.

8. The management method according to claim 7, wherein the set condition includes at least one of a case in which the vehicle enters an intersection, a case in which an accident of the vehicle has occurred, a case in which the vehicle cannot move due to congestion, and a case in which the vehicle cannot move due to construction.

9. The management method according to claim 1, wherein instructions for the first processor are associated with a specification of the vehicle, and
the second processor changes instructions for the first processor in accordance with the specification of the vehicle.

10. The management method according to claim 1, wherein the first processor remotely sends a travelling instruction to the vehicle when the vehicle can no longer move and the first processor has received a request for a travelling instruction from the vehicle.

11. The management method according to claim 1, wherein the first processor is configured to recognize information indicating where and what attributes of the vehicle are present based on at least one of the information on the city area acquired by the sensor and the information detected by the sensor of the vehicle and provides the recognized information for the vehicle.

12. The management method according to claim 1, wherein
the vehicle is an electric car that is driven by power of a battery, and
the first processor comprises a charging/discharging management unit that monitors a charging amount of the battery of the vehicle and sends an instruction regarding a timing and a charging/discharging place where the vehicle should perform charging/discharging to the vehicle based on the charging amount.

13. The management method according to claim 12, wherein
the sensor acquires information on an amount of power generation of each of a plurality of power generators located in the predetermined city area,
each of the power generators is configured to charge a battery of the vehicle, and
the charging/discharging management unit determines a power generator capable of charging the vehicle from among power generators based on information on an amount of power generation of each of the power generators acquired by the sensor, determines a vehicle to be charged based on charging amounts of the batteries of the vehicles, and sends an instruction to the vehicle so that the determined vehicle can be charged by the determined power generator.

14. The management method according to claim 1, wherein the first processor and the second processor manage information on the vehicle based on identification information associated with the vehicle.

15. A management system comprising:
a sensor that is provided in infrastructure of a predetermined city area and is configured to acquire information on the city area;
a first processor configured to send instructions to respective vehicles for providing a plurality of different conveyance services, each of the vehicles including: a respective sensor configured to detect the information on the city area and moving in the city area based on the information detected by the respective sensor, thereby providing each of the conveyance services; and an autonomous controller configured to perform feedback control and autonomous control based on the information detected by the sensor;
a second processor configured to send an instruction to the first processor based on the information on the city area acquired by the sensor;
when the second processor has sent an instruction to the vehicle via the first processor, the second processor accumulates obedience information indicating whether the vehicle has followed the instruction;
the second processor changes instruction for the vehicle based on the obedience information; and
when the vehicles cross each other at an intersection without traffic lights, the second processor sends an instruction to the vehicle that has followed the instruction, so as to prioritize the vehicle that has not followed the instruction, based on the accumulated obedience information.

16. A management system comprising:
a sensor provided in infrastructure of a predetermined city area and configured to acquire information on the city area;
a vehicle management server configured to send instructions to respective vehicles for providing a plurality of different conveyance services, each of the vehicles including: a respective sensor configured to detect the information on the city area and moving in the city area based on the information detected by the respective sensor, thereby providing each of the conveyance services; and an autonomous controller configured to perform feedback control and autonomous control based on the information detected by the sensor;
a platform server configured to send an instruction to the vehicle management server based on the information on the city area acquired by the sensor;
when the platform server has sent an instruction to the vehicle via the vehicle management server, the platform server accumulates obedience information indicating whether the vehicle has followed the instruction;
the platform server changes an instruction for the vehicle based on the obedience information; and
when the vehicles cross each other at an intersection without traffic lights, the platform server sends an instruction to the vehicle that has followed the instruction, so as to prioritize the vehicle that has not followed the instruction, based on the accumulated obedience information.

17. A non-transitory computer readable medium storing a program causing a computer to execute a management method, the management method comprising:
a process of acquiring, by a sensor provided in infrastructure of a predetermined city area, information on the city area;
a process of sending instructions to respective vehicles for providing a plurality of different conveyance services, each of the vehicles including: a respective sensor configured to detect the information on the city area and moving in the city area based on the information detected by the respective sensor, thereby providing each of the conveyance services; and an autonomous controller configured to perform feedback control and autonomous control based on the information detected by the sensor;
a process of sending an instruction to a vehicle based on the acquired information on the city area;
when an instruction has been to the vehicle for providing a conveyance service, a process of accumulating obedience information indicating whether the vehicle has followed the instruction;
a process of changing an instruction for the vehicle based on the obedience information; and
when the vehicles cross each other at an intersection without traffic lights, a process of sending an instruction to the vehicle that has followed the instruction, so as to prioritize the vehicle that has not followed the instruction, based on the accumulated obedience information.

* * * * *